(No Model.) 4 Sheets—Sheet 2.
S. S. WHEELER & C. S. BRADLEY.
ELECTRIC TRANSPORTATION SYSTEM.
No. 448,598. Patented Mar. 17, 1891.
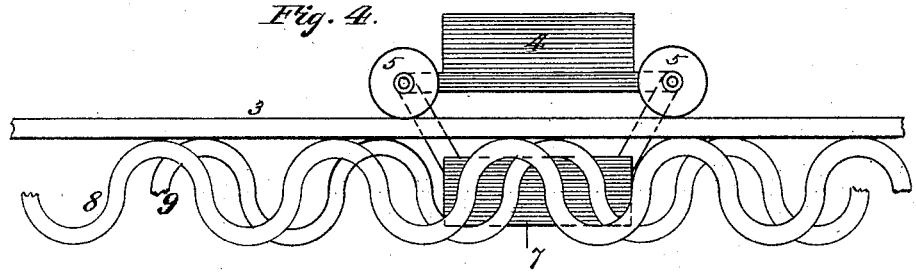
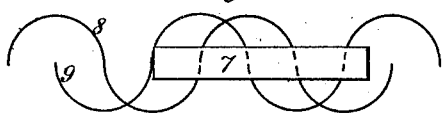
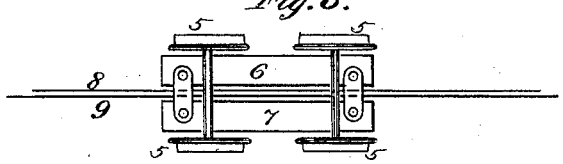
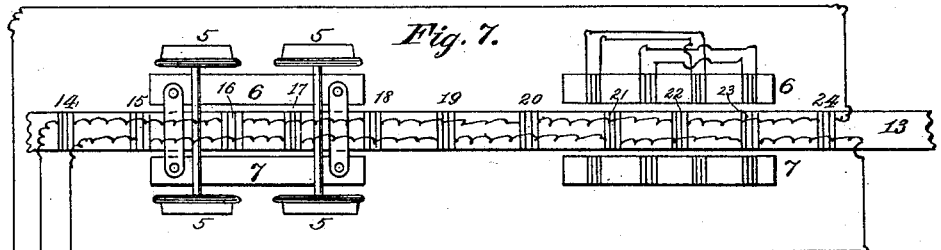
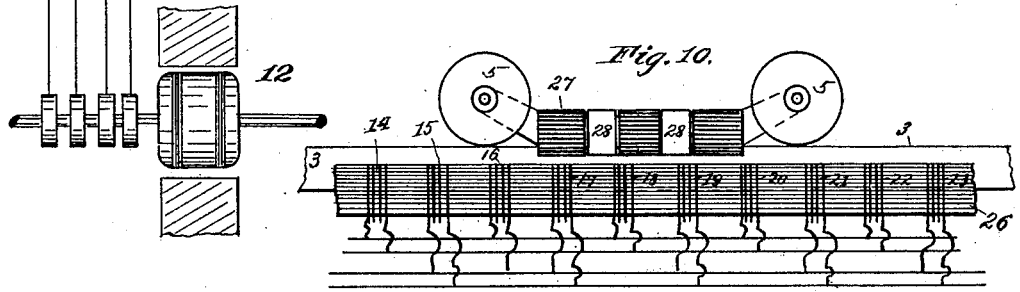
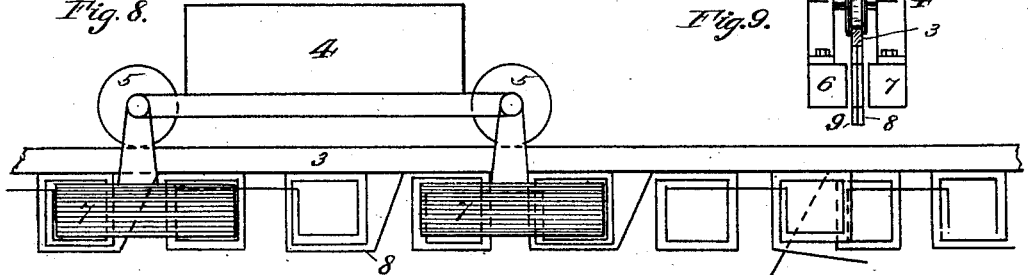
WITNESSES:
E. C. Grigg.
S. E. Field.
INVENTORS.
Schuyler S. Wheeler
Charles S. Bradley
BY
McTigher Worthington
ATTORNEYS (No Model.) 4 Sheets—Sheet 3.
S. S. WHEELER & C. S. BRADLEY.
ELECTRIC TRANSPORTATION SYSTEM.
No. 448,598. Patented Mar. 17, 1891.
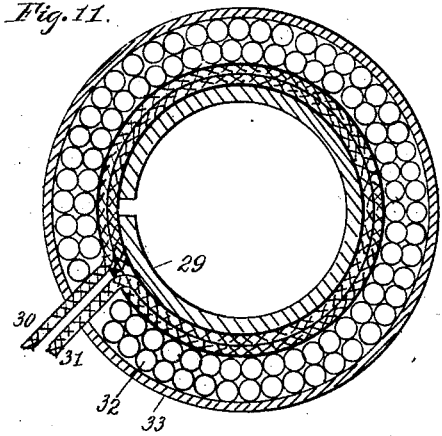
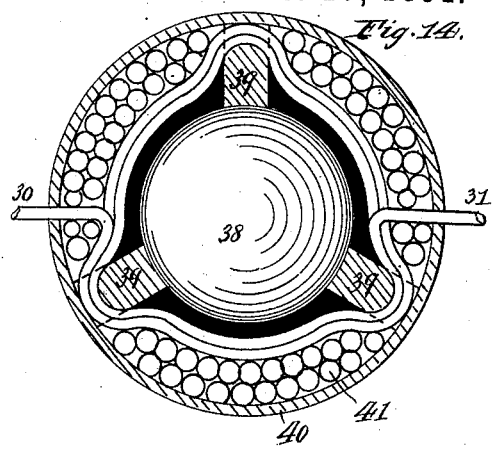
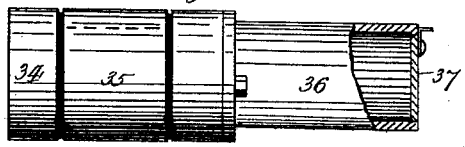
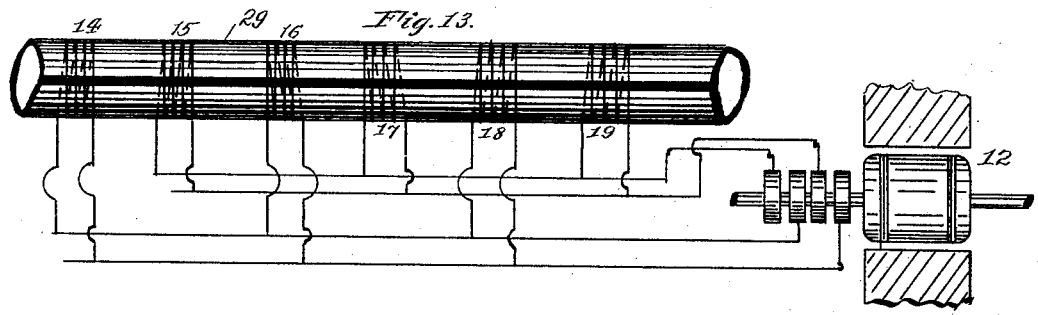
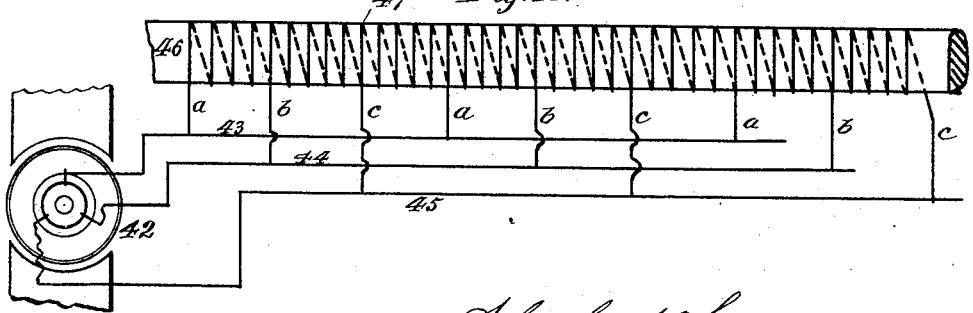
WITNESSES:
E. C. Grigg.
S. E. Field.
Schuyler S. Wheeler
Charles S. Bradley, INVENTORS.
BY
McTighe & Worthington
ATTORNEYS (No Model.) 4 Sheets—Sheet 4.

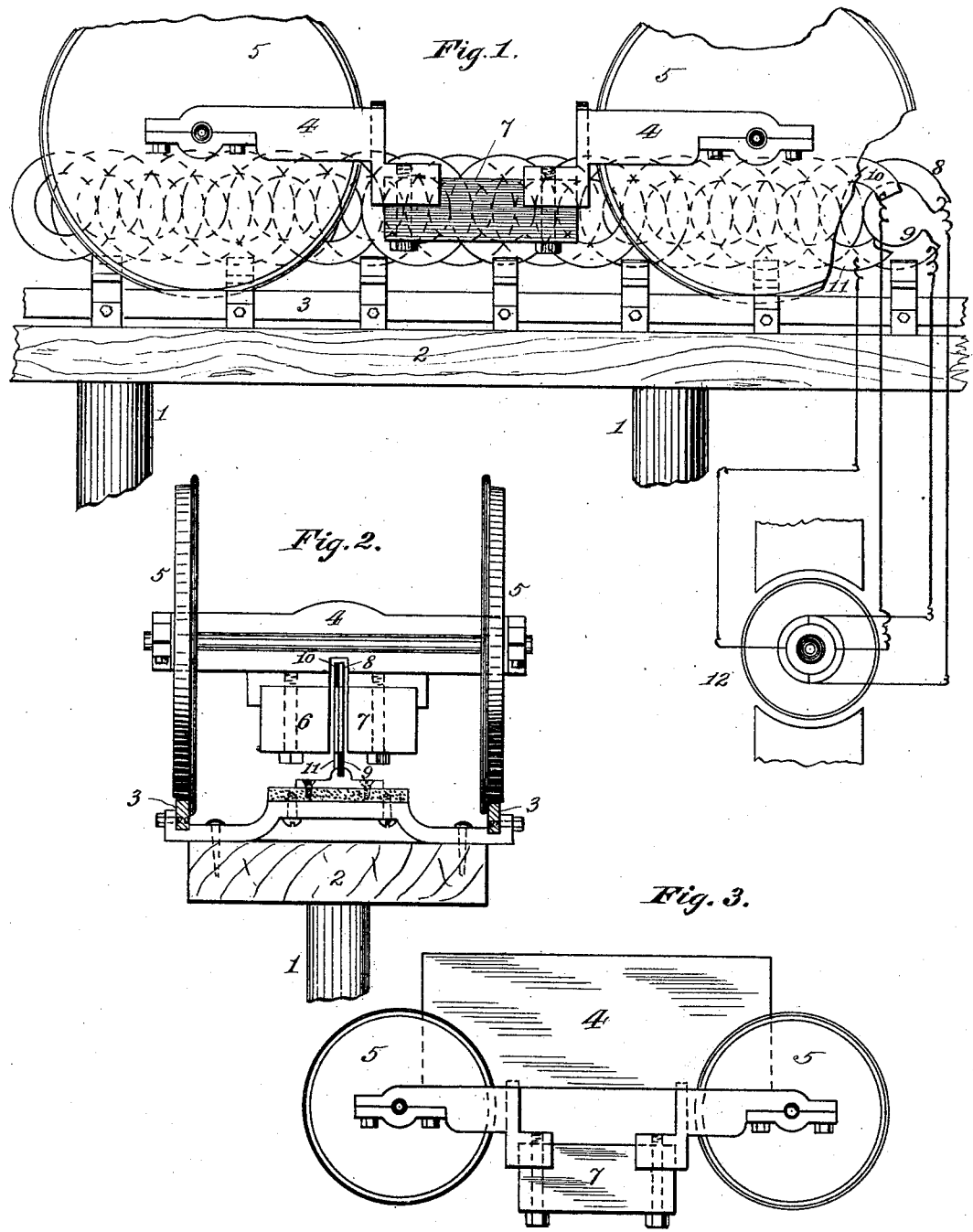

S. S. WHEELER & C. S. BRADLEY.
ELECTRIC TRANSPORTATION SYSTEM.

No. 448,598. Patented Mar. 17, 1891.

UNITED STATES PATENT OFFICE.

SCHUYLER S. WHEELER AND CHARLES S. BRADLEY, OF NEW YORK, N. Y., ASSIGNORS TO SAID WHEELER, TRUSTEE.

ELECTRIC TRANSPORTATION SYSTEM.

SPECIFICATION forming part of Letters Patent No. 448,598, dated March 17, 1891.

Application filed July 29, 1889. Serial No. 319,001. (No model.)

*To all whom it may concern:*

Be it known that we, SCHUYLER S. WHEELER and CHARLES S. BRADLEY, citizens of the United States, residing at New York, in the county of New York and State of New York, have invented certain new and useful Improvements in Electric Transportation Systems; and we do hereby declare the following to be a full, clear, and exact description of the invention, such as will enable others skilled in the art to which it appertains to make and use the same.

This invention relates to a system of electrical transportation, and has for its object the organization of a complete system for the propulsion of vehicles over a railway, the system being such that no contacts, moving or rolling, are required to render the electrical energy available for the propulsion of the vehicle.

A further object is to utilize alternating currents for the foregoing purpose.

While our invention is applicable to the propulsion of vehicles of any character over fixed ways or rails, we have more particularly designed it for use in the rapid transportation of small cars adapted to carry mail-matter and express packages.

To these and other ends our invention comprises a fixed railway of any suitable character, one or more stationary alternating-current generators, a car adapted to travel along the railway and formed in whole or in part of inductive material, and two or more specially-arranged inducing-conductors carrying two separate alternating currents of differing phase.

Our invention further comprises the arrangement and combination of instrumentalities, substantially as hereinafter fully described and claimed.

Figure 16:
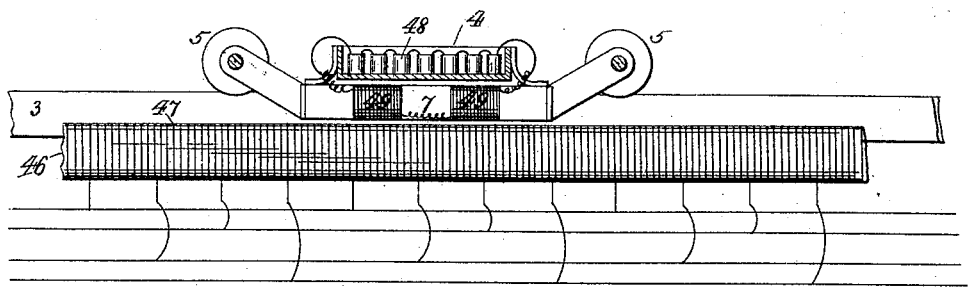
Figure 17:
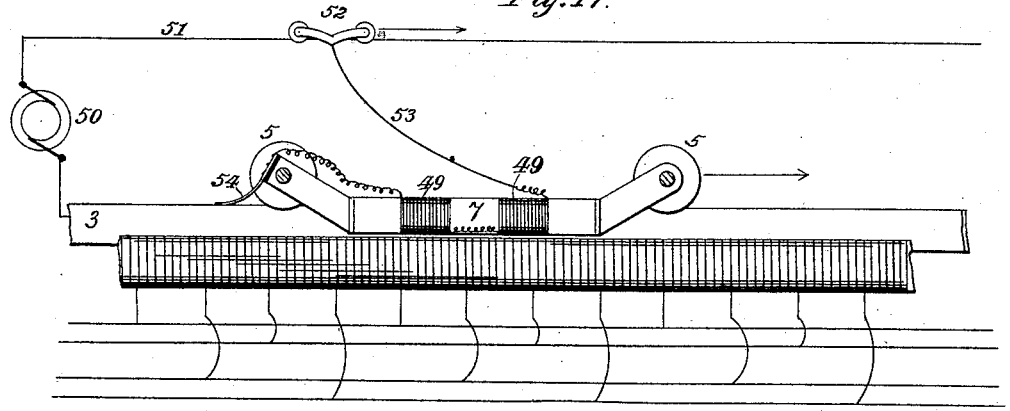

In the drawings which form a part of this specification, Figure 1 is side elevation of a railway for package transportation arranged in accordance with our present invention. Fig. 2 is a transverse sectional elevation of the same. Fig. 3 is a side elevation of the traveling car complete. Fig. 4 is a side elevation of a modification having separate return-conductors. Figs. 5 and 6 are respectively side elevation and plan of the electric elements apart from the railway. Fig. 7 is a plan diagram illustrating the inducing-circuit associated with iron bars or cores and the induced mass both with and without windings. Figs. 8 and 9 are respectively side elevation and cross-section of another modification. Fig. 10 is a modification in side elevation, showing car with inductive circuits on its mass of iron. Fig. 11 is a cross-section of another modification, and Fig. 12 a side elevation of the car; and Fig. 13 is a diagram showing circuits adopted for the same. Fig. 14 is a cross-section of a modified form of the tubular system. Fig. 15 is a diagram showing a three-wire system for three alternating currents one-third of a phase apart. Fig. 16 is a diagram showing the moving iron mass to be polarized, in this case by a small battery on the car; and Fig. 17 is a diagram showing a stationary generator for the same purpose.

Referring now to Figs. 1, 2, and 3, our invention can be briefly described as follows: Upon a suitable structure, a simple form of which consists of the supporting posts or standards 1 and the stringer-piece 2, we arrange the track-rails 3 3 at a suitable distance apart, and on these rails we place the carrier or car 4, having the wheels 5 mounted on the car by any suitable or preferred arrangement of parts. Along each side between the wheels the car has attached to it the separate masses of iron 6 and 7, so arranged as to leave between them a longitudinal space or opening, as shown. Upon the stringer-piece 2, in a position corresponding exactly to the space between the inductive masses 6 and 7, we arrange the undulating inductors 8, 9, 10, and 11, which are arranged relatively over a suitable length of the railway in the manner shown at Fig. 1, the relations being such with respect to the masses of iron 6 and 7 on the car 4 that the undulations in the inductors 8, 9, 10, and 11 extend equally above and below the axial line of the said masses of iron on the car.

The ends of the inductors 8 and 9 and those of the inductors 10 and 11, respectively, are connected to the terminals of an alternating-current dynamo-electric machine 12, adapted to generate and deliver thereto two separate and distinct alternating currents, which differ from each other in their time periods, the difference in period required depending upon the arrangement of the inductors above mentioned. As arranged in Fig. 1, the difference in period required to be provided will be one-quarter of a phase or wave length in said currents; but if the undulations in the inductors be differently arranged the difference in phase between the two distinct alternating-current circuits may be one-third of a phase, or any other fraction of a wave-length found suitable for the purpose.

Under the foregoing conditions the inductor undulations 8 and 9 will lie along one side in close proximity to the inductive mass 6 on the car 4, and the other inductors 10 and 11 will lie along in close proximity to the inductive mass 7 on the car, the intention being that each of the two inductors will have its inductive effect more especially developed in the mass of iron nearest to it carried by the car.

When the generator 12 is in operation, the flow of currents through the circuits formed by the inductors 8, 9, 10, and 11 will produce what we may term a "continuous succession of polar waves," flowing from end to end of the inductors, whatever be the length of the latter, and this continuous succession of polar waves will have the effect of tending to drag in the same direction any body of inductive material which may be within close enough range to feel the impulse and be free to move under it. In the construction above set forth the continuous succession of polar waves has the effect of dragging the masses of inductive material 6 and 7 always in a single direction so long as the currents of the generator 12 are maintained normal, and the masses 6 and 7 being sustained with as little friction as possible upon the rails 3 by means of the wheels 5 the car 4 and its contents are rapidly propelled to the given direction.

The inductors may conveniently consist of wide but thin strips of copper, so as to occupy but little space laterally, and have a low electrical resistance.

A generator of the class called for by this invention is set forth in Letters Patent No. 390,439, issued to C. S. Bradley, one of the present applicants, on October 22, 1888, to which reference is hereby made. Upon consideration of the invention thus described it will be seen that the propulsion of the car can be effected in a practical and substantial manner without any connection whatever being formed electrically between the circuits formed by the inductors, as the external circuit of the generator 12 and the moving vehicle or car. There being no friction whatever except that of the wheel-bearings of the car, and no resistance to its motion except that of the atmosphere in front of it and the force of gravity, a very high rate of speed can be readily obtained in the car with a comparatively small expenditure of energy on the part of the generator 12, and at the same time a reasonably good efficiency of conversion is attainable. The forward movement of the car from the moment of starting will be continuously accelerated until its speed has become nearly equal to the speed of propagation of the polar waves along the inductor, and then remains constant. The result is that so long as current is flowing normally a car will not stop and a great number of cars can be dispatched over the line, one after the other, in rapid succession without the possibility of overtaking one another, and consequently even with a comparatively small package-car a very large amount of traffic can be accommodated in a very short time.

It may be desirable to impart a motion to the car by other agencies at the start. For example, the terminal station may have an inclined pair of rails leading to the permanent railway, and the loaded car may be allowed to run down such incline by gravity, so that when it does reach the railway proper its acceleration to the normal speed will take place in a very much shorter time than would otherwise be the case. We thus have provided a complete electrical transportation system capable of enormous speeds of travel without any contact devices whatever, without commutators, and without the necessity of placing motors of any kind whatever upon the moving vehicles.

Obviously the mere arrangement of the rails and permanent way is a matter of choice and design and can be modified to suit any requirements or in accordance with the judgment of the designer, and if the railway structure itself be properly arranged and the cars likewise the speed attainable on such a railway will be exceedingly high, as the limitation will be only that due to mechanical strength and ability to withstand the various changes which will be incidental to such very high speeds.

The invention whose principles are above set forth is capable of a great number of modifications, a few of which we will describe.

In Fig. 4 we have shown the inductors as a single pair running along the permanent way, as in Fig. 1, but instead of returning upon themselves, as in said figure, the return-circuit to the generator 12 is made separately. The inductive effect, therefore, is that due to the currents flowing through the outgoing circuits formed by the inductors 8 and 10, and whose undulations in this case are arranged to lap each other, so that one is, with respect to the permanent way, one-fourth of a phase or undulation behind the other. In this construction the continuous succession of polar waves will take place when two alternating currents differing from each other in their time periods in a corresponding manner flow through the inductors 9 and 10. The principles of action may be more clearly shown in the diagrams Figs. 5 and 6, the former of which is intended to represent a side elevation and the latter a plan view of the arrangement shown in Fig. 4. In this case the inductors are shown as undulating solid lines, and the masses of iron or steel 6 and 7 are shown in inductive proximity to the same. When the current in inductor 8 is at a maximum positive it tends to induce an N-pole at a point corresponding to the maximum of upward undulation in the inductor 8 and an S-pole at a point corresponding to the maximum downward undulation of the inductor 8, as indicated in Fig. 5. These poles are for the time being to be considered as phantom poles or as fields of force, and they induce opposite poles in the masses of iron 6 and 7. Now as the positive impulse of current in inductor 8 falls away to zero in passing to a negative impulse, the impulse in inductor 10 rises toward a maximum negative and creates a phantom N-pole or field of force about midway of its downward undulation; but as the inductor itself is mechanically located in a position slightly advanced with respect to that of the inductor 8 the tendency is of course to attract the N and S poles, which have been induced in the masses of iron 6 and 7, and as the latter are free to move the attraction which is thus set up causes a forward movement of the said masses. As the impulses are alternations of current, the two inductors 8 and 9 are continuously succeeding each other and one set is behind the other with respect to its time period. The foregoing action is continually repeated and the masses of iron 6 and 7 are continuously dragged forward, accelerating in speed of motion until the speed of movement of the said masses is nearly equal to the speed of propagation of the polar waves set up by the current impulses in the stationary inductors, when it remains constant so long as the conditions remain unchanged.

For the purpose of realizing greater power and higher efficiency we prefer to have the inductors associated with a mass or masses of iron, which, like said inductors, will be stationary and constitute a part of the permanent way. We can then wind the inducing-conductors transversely and obtain more ampère-turns in a given length. This modification is shown as a diagram in Fig. 7, wherein the car is arranged to carry the masses of iron or steel 6 and 7, as before. Along the railway underneath we arrange a continuous beam of iron 13, so located as to be straddled by the masses 6 and 7. At suitable intervals the iron beam 13 is wound with one or more convolutions of conductor, forming the coils 14, 15, 16, 17, 18, 19, 20, 21, 22, 23, and 24. These coils are connected in alternation to form two separate circuits, the coils of each circuit being arranged in multiple arc, and connected, respectively, into two alternating-current-supply circuits connected with the generator 12, and the relations will be the same as before described, namely, that these two independent circuits will be supplied with two alternating currents differing from each other in their time period. In this modification substantially the same actions take place, but the inductive features are more marked in consequence of the iron core being present and permitting the attainment of a much stronger propelling power with a given weight and current. Obviously this effect may be still further enhanced by winding closed coils around the masses 6 and 7, as indicated at the car diagrammed at the right of Fig. 7. In the case where an iron bar is used with the above-described windings thereon the highest efficiency will be attained by so arranging the two independent circuits that all coils in one of them will be in multiple arc, since in that case the increased inductive effect due to the iron is active for increasing the difference of potential only at points within the length of the masses of iron of each car, and as this is where the energy is wanted the current flowing through the remaining coils does not waste.

In order to avoid any misunderstanding, we wish to state that in all cases where the inductors are not associated with iron in the construction of the permanent way we prefer to arrange each of the two alternating circuits as series circuits—that is, all the inductors belonging to a given length of the railway for each of the differing phase-circuits will be laid as a continuous series, while in all cases where the inductors are associated with iron the best arrangement will be to have the various portions of inductor which belong to one of the alternating circuits arranged in multiple-arc relation to supply such supply-circuit. In the latter case there will be no short-circuiting effect due to the direct connection, because where the inductive mass carried by the car is absent the counteracting or "kicking-back" effect will practically prevent the flow of current across the circuits at those points, so that the current will flow only at the positions momentarily occupied by the car.

Another modification is illustrated at Fig. 8 in side elevation and Fig. 9 in cross-section, wherein the inductors 8 and 9 take the form of a succession of coils, which are, however, not associated with iron, and the car 4 is constructed to carry a magnetic mass in inductive proximity to the series of coils. As before, the coils are connected alternately into separate supply-circuits carrying two independent currents differing in phase.

Another modification is illustrated in Fig. 10, where the inductor structure forms the permanent way and support for the rails. In this we have the laminated iron beam 26, which is slotted transversely at its upper side, so as to permit the winding at intervals of the inductor-coils 14 15 16, &c., similarly to the winding shown at Fig. 7, and in this case the connections of these coils and their relations to the supply-circuits are the same as in Fig. 7. The beam 26 is arranged to support the rails, and the car carries a laminated iron bar 27, at one or more points of which are wound the coils 28, which form closed circuits and have the effect of increasing the efficiency, as in the modification illustrated at Fig. 7 in the right-hand car.

Figs. 11 and 12 illustrate another modification, wherein the permanent way is constituted by a slotted tube 29, which can to advantage be composed of iron, and around this are wound two series of inductor-coils 30 and 31, arranged in the same manner as described in Figs. 7 and 10—that is to say, in multiple arc with the two independent supply-circuits. The inductors 30 and 31 are surrounded in turn by a sheathing of iron wires 32, laid longitudinally, and this sheathing is protected by the external casing 33, the latter being of iron or other suitable material, and provided at intervals with openings for the terminals of the coils 30 and 31. Inside this structure is placed loosely a magnetic mass 34, preferably having the copper band 35 wound around it, and also provided at one end with the receptacle 36, having a door 37 or other means of access. This device may be arranged so as to present as little resistance to air-friction as possible, and when placed in the structure shown at Fig. 11 the same actions take place as already described, and the car composed of the parts 34, 35, and 36 immediately starts into motion and its speed accelerates, as before described, until a maximum has been reached, at which it continues so long as the current conditions remain unchanged. Fig. 13 more clearly shows the arrangement of circuits in the form of a diagram as applied to this tubular form of permanent way and internal car or carrier. Obviously in this, as also in all other cases where the arrangement is that of multiple arc with reference to the supply-circuits, the conductors constituting the latter may be conveniently carried on the structure of the permanent way, so that the entire system may be self-contained.

Fig. 14 represents in cross-section a modification of the design represented in Figs. 11 and 12. In this case the car is in the form of a hollow sphere 38, of iron, and arranged to be guided by the three rails 39, which are suitably held by means of bolts passing through from the external casing 40. In this form the inductors are compelled to swerve outwardly past the guide-rails, and the sheathing of iron wires 41 is not quite as complete as in the form shown at Fig. 11; but still it is sufficient for practical purposes. In this modification, instead of using the spherical carrier 38, we may, if desired, use an elongated form in order to obtain a larger mass in inductive proximity to the inductors. The circuits in this case will be similar to those set forth in Fig. 13—namely, in multiple-arc relation with the supply-circuits.

In all of the foregoing modifications it is to be understood that the inductors are to be so arranged that one half of them will receive one alternating current and the other half will receive a separate alternating current differing from the other in its time-phase, and in all the figures so far described it will be observed that this difference of time-phase is one-quarter of a wave length or period of alternation.

As an instance showing a different relation of the time-phases and a different arrangement of supply-circuits, as also a different arrangement of the winding of inductors, reference is made to Fig. 15. In this case the generator 42 is arranged with its armature constructed as a closed circuit, which is tapped at three equidistant points, from which connecting devices are led to the external circuits, consisting of the mains 43, 44, and 45. This arrangement of the generator and external circuits has the effect of producing three independent sets of alternations, each of which will differ from that on either side of it by one-third of a wave length, and at the same time the external circuits 43, 44, and 45, while made up of but three wires or conductors, can be permutated in pairs, so as to form three totally distinct circuits, neither of which will in any manner interfere with the other. With such a generator and its external supply-circuits it is possible to arrange the permanent way in the form of a laminated beam 46, wound continuously with inductor-wire 47, similar to a Gramme ring, and this at definite equal distances is connected in regular succession to the three main supply-wires 43, 44, and 45—that is to say, a given length of the winding 47 will have three connections made to it at equal distances apart. Of these, $a$ connects to conductor 43 and $b$ connects to conductor 44, thus forming at the proper time a circuit between 43 and 44 through $a$, the intervening coils of 47, and back through $b$. $b$ and $c$ form another pair, connecting the inductor 47 at the proper time with the conductors 44 and 45 as the supply-circuit, and $c$ and the next $a$ similarly at another interval of time connect the inductor 47, lying between them, into the supply-circuit formed by the main conductors 45 and 43. The arrangement thus shown is continued throughout the length of the permanent way, or throughout such section of it as may be supplied by the generator 42 and its external circuits. In this case of course the arrangement of the inductor 47 is that of multiple arc, and the car and its magnetic mass may be of any of the forms hereinbefore described. In all these cases it is not at all necessary to have the arrangement continuous from one end to the other of the permanent way. It is, on the contrary, not only practicable to divide the permanent way into sections, each supplied with its own set of inductors, and these in turn supplied either from a single generator and feeder-wires, or each section of inductor having its own separate generator. There is an advantage in some cases in the latter arrangement, as it permits a variation of speed of transportation, which may be useful in some special instances. For example, the first section of a line running from a city might need to have the speed of transportation not to exceed a given figure, and the outlying sections in the country districts could be operated at a much higher rate of speed. In cases where the magnetic mass on the car is to be polarized directly it is manifest that this may be accomplished in a variety of ways. Obviously the mass may be magnetized permanently; or, instead, it may be directly polarized, as shown in Fig. 16, wherein the car 4 carries a battery 48, which is connected to the polarizing-coils 49, wound on the mass of iron 7, which moves along in close proximity to the inductor, as before; or, again, the polarization of the mass 7 may be effected by passing through its coils 49 a continuous current from a stationary generator 50, as in Fig. 17, the current being introduced in any of the well-known ways—as, for example, through the overhead wire 51, trolley 52, and flexible connection 53, returning through rails 3 by suitable sliding or rolling contacts 54.

We claim as our invention—

1. An electric transportation system comprising a movable vehicle or car carrying a magnetic mass, a guideway for said car, and an inductor along the guideway, the mass and inductor being continuously in inductive relation and connection with a source of energy for propagating along the guideway a succession of polar waves, whereby a movement of translation will be imparted to the car by the successive waves.

2. An electric transportation system comprising a movable vehicle or car carrying a polarized magnetic mass, a guideway for said car, and an inductor along the guideway, the mass and inductor being continuously in inductive relation and connection with a source of energy for propagating along the guideway a succession of polar waves, whereby a movement of translation will be imparted to the car by the successive waves.

3. An electric transportation system comprising a movable car carrying an inductive mass, a line of way containing a continuous inductor, and a generator supplying currents differing in time phase for propagating over the inductor by the combined action of the impulses differing in time phase a series of magnetic waves, whereby a motion of translation will be imparted to the car by the effort of the inductive mass to follow the wave.

4. An electric transportation system comprising a movable vehicle carrying an inductive mass in operative relation to an inductor fixed along the guideway for the vehicle, an alternating-current generator, and circuit-connections for establishing a progressive consequent polar field along the inductor by the combined effort of two currents differing in time phase.

5. An electric transportation system comprising a movable vehicle or car carrying a magnetic mass, a guideway for said car, an inductor arranged along such way, two independent supply-circuits therefor, and a stationary source of current adapted to deliver to said supply-circuits alternating currents differing in phase.

6. In an electric transportation system, a railway and a car traveling thereon carrying a magnetic mass, in combination with a continuous bar or beam of iron wound with insulated conductor, and means for propagating along such bar of iron a succession of polar waves.

7. In an electric transportation system, a railway and a car traveling thereon carrying a magnetic mass, in combination with a continuous bar or beam of iron wound with insulated conductor, two independent supply-circuits suitably connected to such conductor, and a stationary source of current adapted to deliver to said supply-circuits alternating currents differing in phase.

In testimony whereof we affix our signatures in presence of two witnesses.

SCHUYLER S. WHEELER.
CHARLES S. BRADLEY.

Witnesses:
  ELLA F. BRAMAN,
  JOSEPH C. BRAMAN.